(12) United States Patent
Chang et al.

(10) Patent No.: US 8,370,874 B1
(45) Date of Patent: Feb. 5, 2013

(54) SUBSCRIPTION AND CHANNEL MANAGEMENT TECHNOLOGY

(75) Inventors: Jack H. Chang, Saratoga, CA (US); William H. Sheu, Fremont, CA (US); Sherman Tuan, Cupertino, CA (US)

(73) Assignee: PurpleComm Inc., Santa Clara, CA (US)

( * ) Notice: Subject to any disclaimer, the term of this patent is extended or adjusted under 35 U.S.C. 154(b) by 251 days.

(21) Appl. No.: 12/795,019

(22) Filed: Jun. 7, 2010

(51) Int. Cl.
*H04N 5/445* (2011.01)
*G06F 13/00* (2006.01)
*G06F 3/00* (2006.01)

(52) U.S. Cl. ............... 725/46; 725/44; 725/45; 725/47

(58) Field of Classification Search ............. 725/44–47, 725/116
See application file for complete search history.

(56) References Cited

U.S. PATENT DOCUMENTS

| | | |
|---|---|---|
| 7,089,579 B1 | 8/2006 | Mao et al. |
| 7,225,456 B2 | 5/2007 | Kitsukawa et al. |
| 2002/0184634 A1 | 12/2002 | Cooper |
| 2003/0110503 A1 | 6/2003 | Perkes |
| 2003/0221197 A1 | 11/2003 | Fries et al. |
| 2005/0081244 A1 | 4/2005 | Barrett et al. |
| 2006/0075428 A1 | 4/2006 | Farmer et al. |
| 2007/0277219 A1 | 11/2007 | Toebes et al. |
| 2008/0022320 A1 | 1/2008 | Ver Steeg |
| 2008/0115182 A1 | 5/2008 | Van Willigenburg |
| 2008/0263610 A1 * | 10/2008 | Murray et al. ............... 725/110 |
| 2011/0214148 A1 * | 9/2011 | Gossweiler et al. ........... 725/46 |

FOREIGN PATENT DOCUMENTS

WO WO2006041784 A2 4/2006

* cited by examiner

*Primary Examiner* — Hunter B Lonsberry
(74) *Attorney, Agent, or Firm* — Fish & Richardson P.C.

(57) ABSTRACT

Subscription and channel management technology, in which a system allows a user to subscribe to a subset of the available channels on a content delivery network and personalize at least one channel. The system identifies a user identity of the user and stores, in a user database, channel subscription information for the user identity based on the subset of channels to which the user subscribed and the user personalization. The system identifies a downloader device associated with the user identity and controls the downloader device based on the channel subscription information stored in the user database.

21 Claims, 16 Drawing Sheets

400

ENABLE A USER TO SUBSCRIBE TO AVAILABLE CHANNELS ON A
CONTENT DELIVERY NETWORK
402

RECEIVE, FROM THE USER, SUBSCRIPTION TO A SUBSET OF THE
AVAILABLE CHANNELS ON THE CONTENT DELIVERY NETWORK
404

RECEIVE, FROM THE USER, USER PERSONALIZATION OF AT LEAST
ONE OF THE SUBSET OF CHANNELS
406

IDENTIFY A USER IDENTITY OF THE USER
408

STORE, IN A USER DATABASE, CHANNEL SUBSCRIPTION
INFORMATION FOR THE USER IDENTITY BASED ON THE SUBSET OF
CHANNELS TO WHICH THE USER SUBSCRIBED AND THE USER
PERSONALIZATION
410

IDENTIFY A DOWNLOADER DEVICE ASSOCIATED WITH THE USER
IDENTITY
412

CONTROL THE DOWNLOADER DEVICE BASED ON THE CHANNEL
SUBSCRIPTION INFORMATION
414

FIG. 4

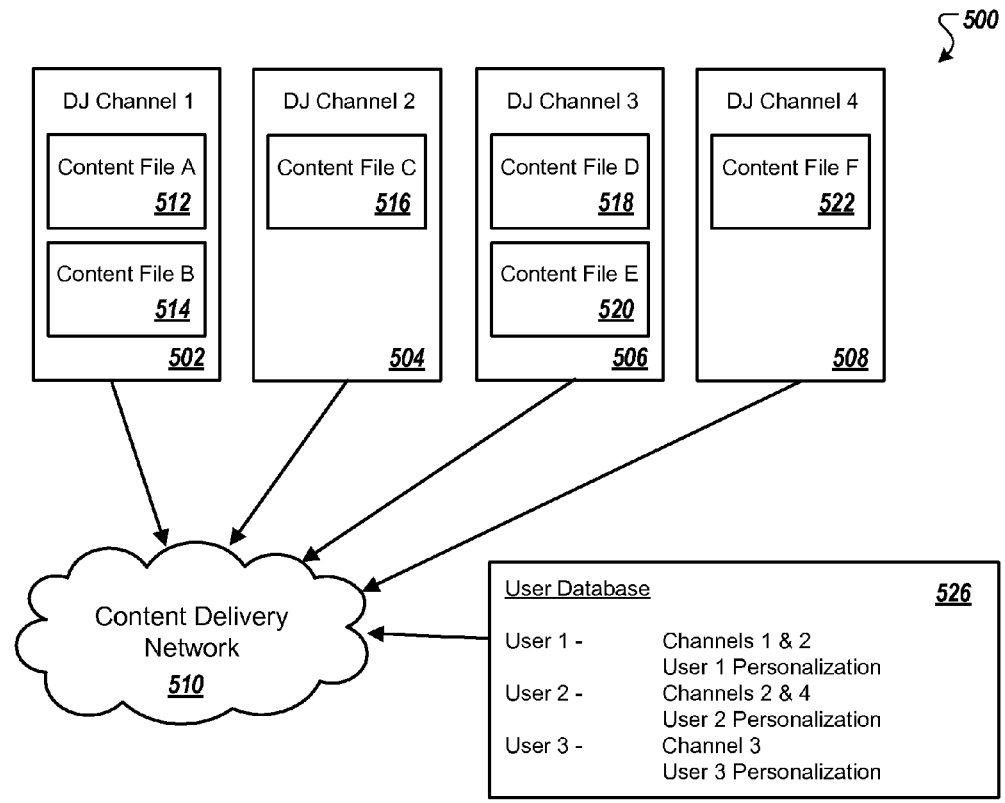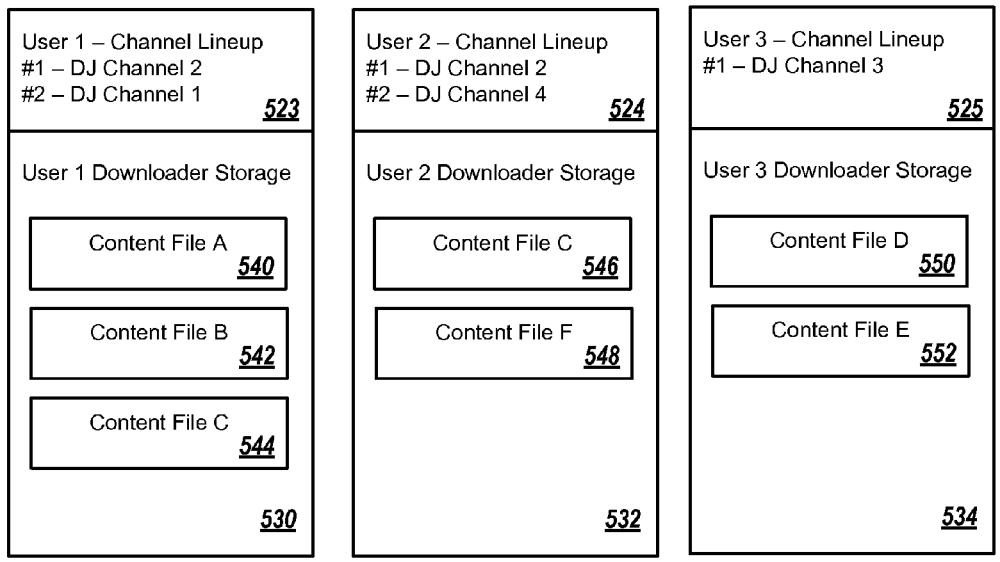
FIG. 5

1000

```
┌─────────────────────────────────────────────────┐
│ RECEIVE, FROM A USER, USER INPUT ADDING ONE OR  │
│           MORE CONTENT FILES TO A CHANNEL       │
│                                           1002  │
└─────────────────────────────────────────────────┘
                         │
                         ▼
┌─────────────────────────────────────────────────┐
│ SET A PERSONALIZED DEFINITION OF THE CHANNEL    │
│         BASED ON THE RECEIVED USER INPUT        │
│                                           1004  │
└─────────────────────────────────────────────────┘
                         │
                         ▼
┌─────────────────────────────────────────────────┐
│  STORE THE PERSONALIZED DEFINITION OF THE       │
│           CHANNEL IN A USER DATABASE            │
│                                           1006  │
└─────────────────────────────────────────────────┘
                         │
                         ▼
┌─────────────────────────────────────────────────┐
│ MAKE THE PERSONALIZED DEFINITION OF THE CHANNEL │
│  AVAILABLE TO A DOWNLOADER DEVICE ASSOCIATED    │
│                  WITH THE USER                  │
│                                           1008  │
└─────────────────────────────────────────────────┘
```

FIG. 10

SUBSCRIPTION AND CHANNEL MANAGEMENT TECHNOLOGY

FIELD

The present disclosure generally relates to subscription and channel management technology.

BACKGROUND

Content viewers today are exposed to an overwhelming amount of information and are challenged by the degree of interaction and personalization needed to manage this massive amount of information. In an era of digital communications, a user may be confused by an array of technology including traditional analog televisions, DVRs (Digital Video Recorders), PVRs (Personal Video Recorders), media centers, EPG (Electronic Program Guide)-based systems, Internet-related content, and traditional remote control devices.

SUMMARY

In one aspect, a method of providing channel information to users of a content delivery network includes enabling a user to subscribe to available channels on a content delivery network, receiving, from the user, subscription to a subset of the available channels on the content delivery network, and receiving, from the user, user personalization of at least one channel. The method also includes identifying a user identity of the user and storing, in a user database, channel subscription information for the user identity based on the subset of channels to which the user subscribed and the user personalization. The method further includes identifying a downloader device associated with the user identity and controlling the downloader device based on the channel subscription information stored in the user database.

Implementations may include one or more of the following features. For example, the method may include displaying, to the user, channel information for channels available on the content delivery network and receiving, from the user, user input subscribing to a subset of channels included in the displayed channel information. In this example, the method may include displaying, to the user, preview content for the channels available on the content delivery network and enabling subscription to a subset of channels included in the displayed channel information based on review of the preview content.

In some implementations, the method may include receiving user input assigning a channel number to a channel subscribed to by the user and storing the assigned channel number of the channel in the user database. In these implementations, the method may include making the channel available on the downloader device at the assigned channel number.

The method may include receiving user input assigning a genre to a channel subscribed to by the user, storing the assigned genre of the channel in the user database, and making the channel available on the downloader device at the assigned genre. The method also may include receiving, from the user, user input adding one or more content files to a channel, setting a personalized definition of the channel based on the received user input, and storing the personalized definition of the channel in the user database. The method further may include making the personalized definition of the channel available to the downloader device.

In addition, the method may include receiving, from the user, user input adding one or more content files to a user-defined channel that only includes content files added by the user, defining the user-defined channel to include the one or more content files, and making the user-defined channel available to the downloader device. The method also may include receiving, from the user, user input adding one or more content files to a channel defined by a content curator that includes content files added by the content curator, supplementing the channel to include the one or more content files added by the user in addition to the content files added by the content curator, and making the supplemented channel available to the downloader device.

In some examples, the method may include retrieving, from the user database, channel links for the subset of channels subscribed to by the user, sending the retrieved channels links to the downloader device, and controlling the downloader device to monitor for updates to channel information for channels subscribed to by the user using the channel links. In these examples, the method may include mapping the user identity to an address of the downloader device at which the downloader device is available on a network and sending the retrieved channels links to the address.

Further, the method may include retrieving, from the user database, personalization information for the at least one channel and sending the retrieved personalization information to the downloader device. The method may include controlling the downloader device to modify the at least one channel in accordance with the retrieved personalization information.

In some implementations, the method may include receiving an update to a channel subscribed to by the user, controlling the downloader device to download updated channel information published at a channel link that corresponds to the updated channel, and controlling the downloader device to download new content added to the updated channel based on the updated channel information. In these implementations, the method may include receiving an indication that the downloader device downloaded the new content added to the updated channel and storing a download record in the user database to indicate that the downloader device has downloaded the new content added to the updated channel.

In some examples, the method may include receiving an update to supplemental channel information for a channel subscribed to by the user and controlling the downloader device to download the updated supplemental channel information published at a channel link that corresponds to the channel. In these examples, the method may include controlling the downloader device to control previously-stored content for the channel based on the updated supplemental channel information.

The method may include receiving, from a first user, subscription to a first subset of the available channels on the content delivery network and receiving, from a second user, subscription to a second subset of the available channels on the content delivery network. The first user may be different than the second user and the first subset of the channels may be different than the second subset of the channels. The method also may include identifying a first user identity of the first user and identifying a second user identity of the second user. The method further may include storing, in the user database, first channel subscription information for the first user identity based on the first subset of channels to which the first user subscribed and storing, in the user database, second channel subscription information for the second user identity based on the second subset of channels to which the second user subscribed. In addition, the method may include identifying a first downloader device associated with the first user identity, identifying a second downloader device associated with the second user identity, controlling the first downloader device based on the first channel subscription information stored in the user database, and controlling the second downloader device based on the second channel subscription information stored in the user database.

In some examples, the method may include receiving, from a first user, first personalization of a first channel subscribed to by the first user and receiving, from a second user, second personalization of the first channel subscribed to by the second user. The first user may be different than the second user and the first personalization may be different than the second personalization. In these examples, the method may include identifying a first user identity of the first user, identifying a second user identity of the second user, storing, in the user database, first channel subscription information for the first user identity based on the first personalization to the first channel, and storing, in the user database, second channel subscription information for the second user identity based on the second personalization to the first channel. Further, in these examples, the method may include identifying a first downloader device associated with the first user identity, identifying a second downloader device associated with the second user identity, controlling the first downloader device to personalize the first channel for the first user based on the first channel subscription information stored in the user database, and controlling the second downloader device to personalize the first channel for the second user based on the second channel subscription information stored in the user database.

The method may include enabling a user to subscribe to available channels that are each defined by a different content curator. The method also may include retrieving, from the user database, the channel subscription information and sending the retrieved channel subscription information to the downloader device.

In some implementations, the method may include displaying representations of content files from a private collection of the user and, after displaying representations of content files included in the private collection of the user, receiving, from the user, input selecting one or more of the content files from the private collection of the user to include in a channel to which the user subscribed. In these implementations, the method may include, based on the input selecting the one or more content files, including the one or more content files from the private collection of the user in the channel to which the user subscribed such that the channel includes content files added to the channel by a content curator that is different than the user and the one or more content files from the private collection of the user.

In addition, the method may include receiving, from the user, input defining a personal channel for the user that includes content files selected by the user to include in the personal channel. The method also may include receiving, from the user, input selecting one or more content files from a private collection of the user to include in the personal channel.

In another aspect, a system includes at least one computer and at least one computer-readable medium coupled to the at least one computer having instructions stored thereon which, when executed by the at least one computer, causes the at least one computer to perform operations. The operations include enabling a user to subscribe to available channels on a content delivery network, receiving, from the user, subscription to a subset of the available channels on the content delivery network, and receiving, from the user, user personalization of at least one channel. The operations also include identifying a user identity of the user and storing, in a user database, channel subscription information for the user identity based on the subset of channels to which the user subscribed and the user personalization. The operations further include identifying a downloader device associated with the user identity and controlling the downloader device based on the channel subscription information stored in the user database.

In yet another aspect, at least one computer-readable storage medium is encoded with at least one computer program comprising instructions that, when executed, operate to cause a computer to perform operations. The operations include enabling a user to subscribe to available channels on a content delivery network, receiving, from the user, subscription to a subset of the available channels on the content delivery network, and receiving, from the user, user personalization of at least one channel. The operations also include identifying a user identity of the user and storing, in a user database, channel subscription information for the user identity based on the subset of channels to which the user subscribed and the user personalization. The operations further include identifying a downloader device associated with the user identity and controlling the downloader device based on the channel subscription information stored in the user database.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 1, 2, 3, 5, 13, 15, and 16 are diagrams of exemplary systems.

FIGS. 4, 6, 8, 10, 12, and 14 are flowcharts of exemplary processes.

Like reference numbers represent corresponding parts throughout.

DETAILED DESCRIPTION

Figure 1:
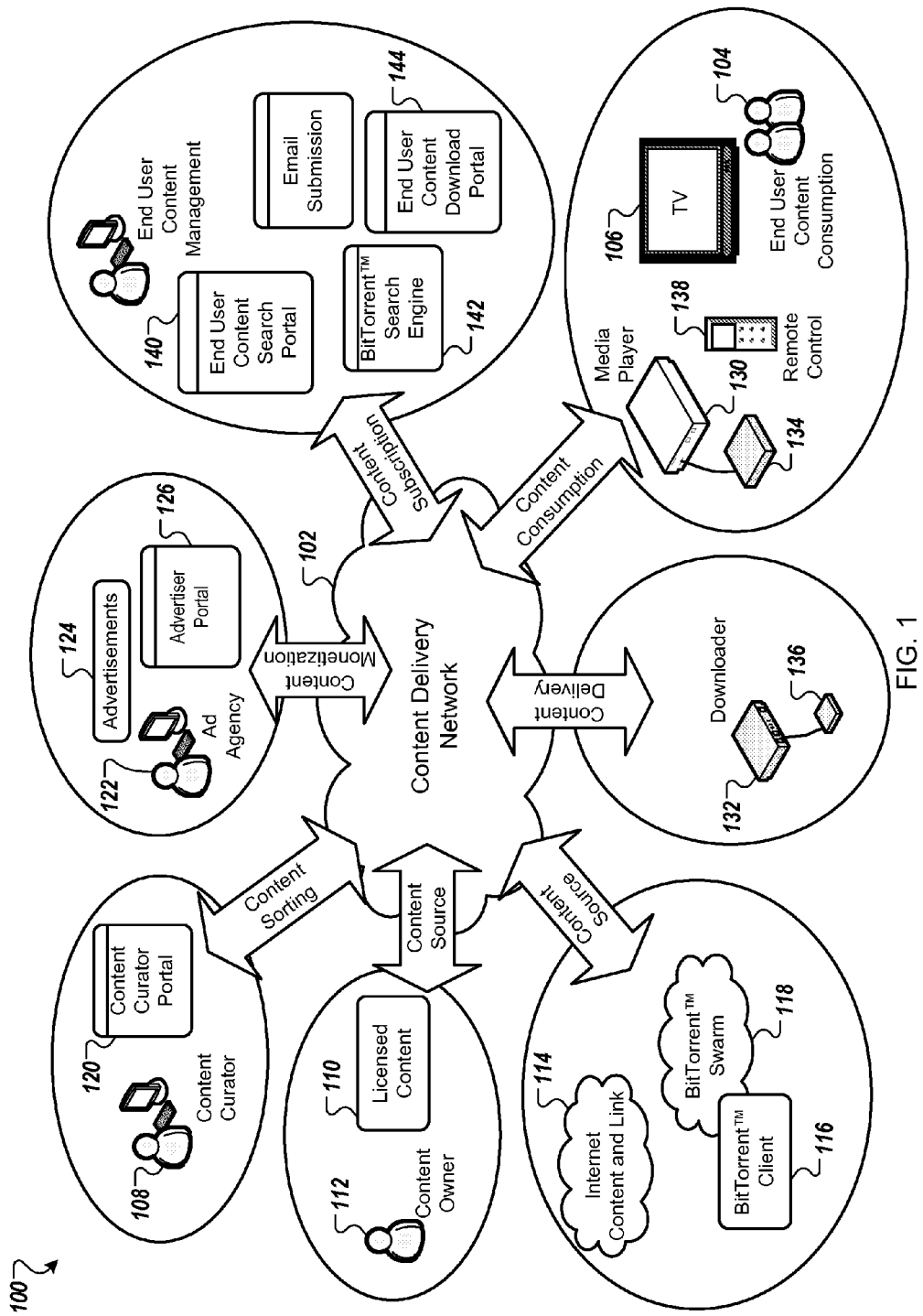

FIG. 1 illustrates a content delivery system 100. The system 100 provides support for various aspects of content delivery, such as content sourcing, content sorting, content monetization, content subscription, content download, and content consumption. The content delivery system 100 includes a content delivery network 102. The content delivery network 102 may be one or more public or private, wired or wireless networks, such as the Internet or a Session Initiated Protocol (SIP) network such as the PsipTN™ network offered by TelTel™. Using the system 100, end users 104 may view channels, for example, on a television 106 located in their home. Channels may be defined by end users 104, or by "content curators" 108.

Multiple types of content, such as audio (e.g., music, podcasts), video, and still images (e.g., photographs), may be made available over the content delivery network 102. Licensed and license-free content may be made available. For example, licensed content 110 may be acquired from a content owner 112.

Content may be made available from a variety of sources. For example, Internet content may be accessed from an Internet link 114 (e.g., URL (Uniform Resource Locator)). Content may also be accessed from peer-to-peer networks. For example, content may be accessed from one or more BitTorrent™ clients 116 which are part of one or more BitTorrent™ "swarms" 118. Content may be accessed from other sources, such as from a television broadcast (e.g., MSO (Multiple System Operator), cable, satellite, local) or from content (e.g., photographs, audio, previously recorded video) available from devices (e.g., DVR, stereo, computer, DVD (Digital Video Disc) player) connected to a user's home network and/or located in a user's home.

Content curators 108 may use a content curator portal 120 to define custom channels which may be made available for subscription by end users 104. The content curators 108 may be commissioned to search for, select, and organize multiple types of content from various sources into channels. Content curators 108 may, for example, organize channels by topic or genre. Content curators 108 may, for example, select licensed content, license-free content, BitTorrent™ content, or content from their private collection, to name a few examples.

Channels may be offered for free to end users 104 or end users 104 may subscribe to channels on a fee basis. Users may rate or rank channels or content curators based, for example, on programming selection, sequencing, and quality. Content curators 108 may be promoted, for example, based on popularity.

Content owners 112 may be compensated for the use of licensed content 110 that they own which is used in channels defined by content curators 108. For example, the system 100 may provide support for digital rights management (DRM). By allowing access to their licensed content 110, content owners 112 may experience increased distribution and revenue and targeted exposure in focused channels. Multiple revenue agreements may be possible, such as per-use agreements, subscription revenue sharing, and advertisement revenue sharing.

A content curator 108 may work with one or more advertisers 122, such as an ad agency, to include advertisements 124 on a channel. For example, an advertisement may be displayed if a user switches a channel or when a program finishes. As another example, advertisements may be displayed on the display of a remote control device, such as while a program is being displayed on a television. Content curators 108, advertisers 122, and content owners 112 may share advertising revenue. Sharing in advertising revenue may provide an incentive for content curators 108 to create interesting and popular channels. A content curator 108 may work with one or more advertisers 122 to create one or more advertisements 124 which are customized and targeted for one or more particular channels. End users 104 may customize advertisement viewing preferences, such as by specifying preferred topics, preferred or excluded companies, region preferences, etc.

Advertisers 122 may use an advertiser portal 126 to upload advertisements 124 and to control advertisement publication. Advertisers 122 may define and apply advertisement insertion rules to particular advertisements 124 and/or may allow a content curator 108 to decide when and how to insert the advertisements 124 into channels defined by the content curator 108. APIs (Application Programming Interfaces) may be provided which allow advertisers 122 to enable the system 100 to interface with standard advertisement inventory management systems to allow for control and management of advertisements 124. Various advertisement pricing plans may be supported, such as individually-priced ads or bulk pricing. Other advertising features may be included, such as online purchasing of items or providing customer contact options.

Advertisers 122, content curators 108, and content owners 112 may access user viewing behavior data. Advertisers 122 may access user viewing behavior data, such as viewed channels, viewed content, viewed advertisements, advertisement display frequency, advertisement viewed length, user actions during advertisement display, user characteristics, advertisement and content view times, advertisement and content view counts, and hosting channel information, to monitor reach and performance of advertising campaigns. Advertisements may be targeted to specific users based on recorded user viewing behavior data. Content curators 108 may access user viewing behavior data to learn about behaviors of end users 104 who subscribe to their channels. Content owners 112 may access user viewing behavior data to learn about their fan base, such as accessing information about user demographics, time of day of access, and user actions during content display. Content presentation and playback may be customized and personalized for a particular end user 104, based specifically on recorded user viewing behavior of the particular end user 104 and generally on recorded user viewing behavior of all users.

User viewing behavior data may be captured, for example, by a media player 130 and/or a downloader device 132. The media player 130 and/or the downloader device 132 may play content included or ordered on a channel defined by a content curator 108. In some implementations, the media player 130 may play content downloaded from the content delivery network 102 by the downloader device 132. In some implementations, the media player 130 and the downloader device 132 are different logical functions of the same physical device. In other implementations, the media player 130 and the downloader device 132 are different physical devices. In some implementations, the media player 130 is a software application which may be executed, for example, on a computing device such as a desktop or laptop computer.

The media player 130 and/or the downloader device 132 may be connected to external media storage devices 134, 136 respectively. The external media storage devices 134, 136 may be, for example, USB (Universal Serial Bus) drives. The external media storage devices 134, 136 may be used, for example, to transfer data to/from the media player 130 or the downloader device 132, respectively, such as to transfer data to/from a computing device.

The media player 130 and/or the downloader device 132 may communicate wirelessly with one or more remote control devices 138. The end user 104 may navigate through channels and perform other functions using the remote control device 138. The remote control device 138 may communicate (e.g., using Infrared (IR) technology of radio frequency (RF) technology) with the television 106, the media player 130, and/or the downloader device 132. The remote control device 138 also may communicate over a network with the media player 130 and/or the downloader device 132 to control functions of the media player 130 or the downloader device 132. The remote control device 138 may include a small display screen that displays preview content and/or advertisements.

The media player 130 and/or the downloader device 132 may download content from the content delivery network 102 without consuming resources of a computing device owned by the end user 104. For example, content may be downloaded into the home of an end user 104 without using resources of a personal computer owned by the end user 104. The media player 130 and the downloader device 132 may use less electricity than a personal computer, thus reducing the electric bill of the end user 104. The media player 130 and/or the downloader device 132 may connect to other computing devices connected on a user's home network. The media player 130 and/or the downloader device 132 may include built-in functionality to communicate with and download information from a peer-to-peer network, such as the BitTorrent™ swarm 118.

The end user 104 may search for and subscribe to content using an end-user content search portal 140. For example, the end-user content search portal 140 may provide a directory listing of available defined channels. The directory listing may be organized in a hierarchy of categories and sub-categories. A particular channel may appear in one or more categories or sub-categories. The end-user content search portal 140 may also provide a search function to allow end users to search for available defined channels based on a keyword search. As another example, users may search for channels based on other criteria, such as sorting channels based on channel or content curator popularity or ranking. An end user may subscribe to a defined channel, for example, by selecting a channel link displayed in a directory listing or in a list of search results.

The end user 104 may also search for and initiate download of individual content items to the downloader device 132 using a partner site such as a BitTorrent™ search engine 142. As another example, the end user 104 may send an email which includes a content link to an email address associated with their downloader device 132 to initiate an automatic download to the downloader device 132 of the content linked to by the content link. The content link may refer to a content file available on the Internet, and may be a reference to a video resource available from a streaming video website. The end user 104 may send an email with an attachment to an email address associated with the downloader device 132, to initiate a download of the attachment to the downloader device 132. The end user 104 may use an end-user content download portal 144 to search for and to select content to download to the downloader device 132.

Figure 2:
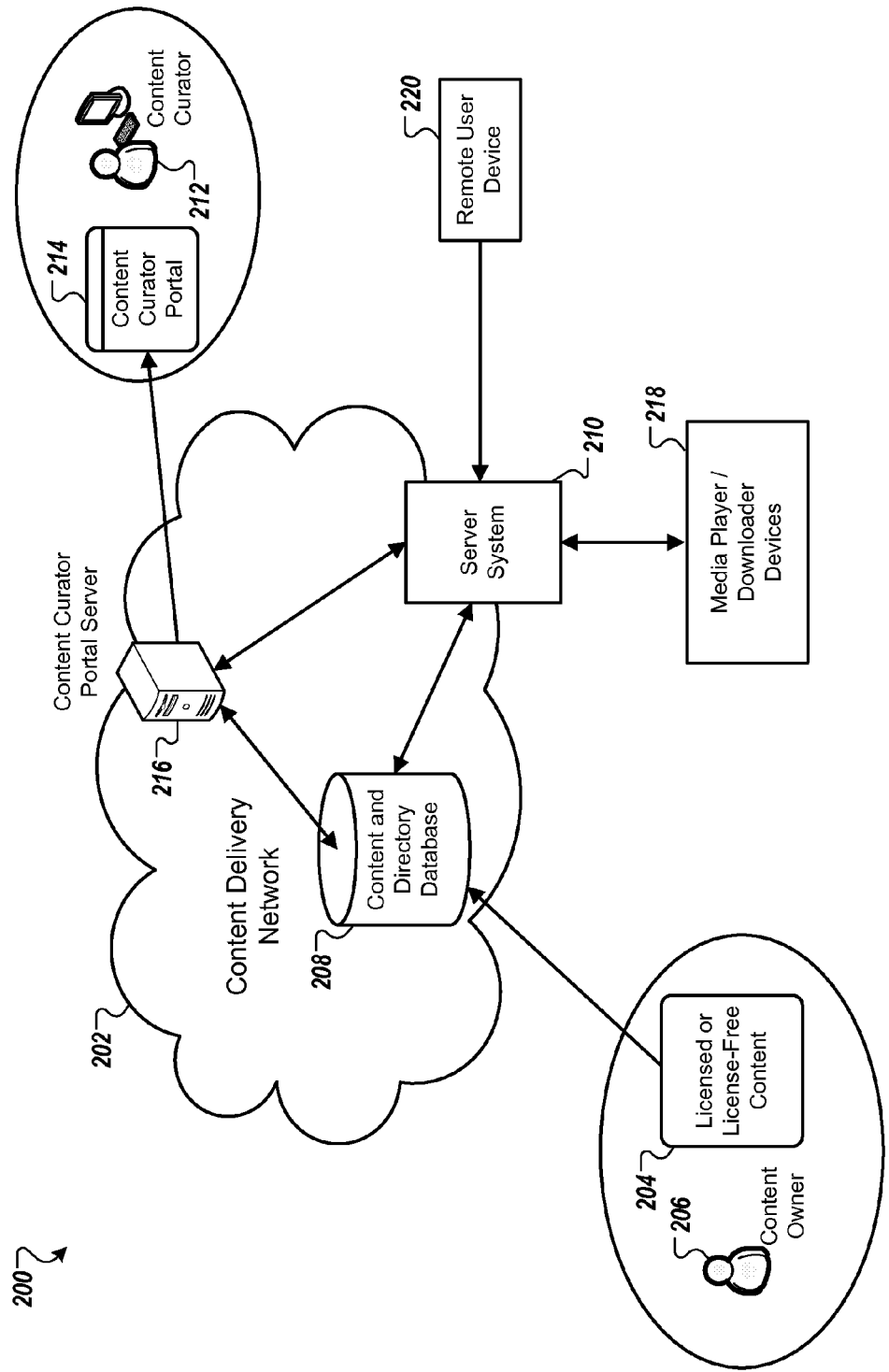

FIG. 2 illustrates a system 200 for content sourcing and download over a content delivery network 202. Licensed or license-free content 204 is acquired from one or more content owners 206 or from a publicly available source, such as the Internet. For example, content owners 206 may transfer content over the content delivery network 202 to a content and directory database 208. Content may also be transferred to the content and directory database 208 from a server system 210, such as using a DVD or CD (Compact Disc) drive. License-free content, such as license-free video or podcasts, may be downloaded from the Internet and stored in the content and directory database 208. In some implementations, some or all content may be stored in the content and directory database 208 as BLOBs (Binary Large Objects). In some implementations, some or all content may be stored in the file system of the server system 210 and references to file system locations may be stored in the content and directory database 208.

The content and directory database 208 stores information about content and also information about defined channels. Content curators 212 may use a content curator portal 214 to define channels and to manage defined channels. The content curator portal 214 may display a listing of licensed and license-free content available in the content and directory database 208. The content curator portal 214 may also provide a search function which allows the content curator 212 to search for content available in the content and directory database 208 and to also search for content included in the private collection of the content curator 212 or content available on the Internet, such as content available from peer-to-peer networks, such as BitTorrent™.

The content curator portal 214 may communicate with a content curator server 216. For example, a channel definition defined using the content curator portal 214 may be sent to the content curator server 216, which may communicate with the server system 210 to request that the channel definition be stored in the content and directory database 208. As another example, information for existing channel definitions associated with a particular content curator 212 may be retrieved from the content and directory database 208 and sent from the content curator portal server 216 to the content curator portal 214 for display.

In some implementations, the content curator portal server 216 is one physical server computing device and in other implementations, the content curator portal server 216 includes multiple physical server computing devices. Similarly, in some implementations, the server system 210 is one physical server computing device, and in other implementations, the server system 210 includes multiple physical server computing devices. In some implementations, multiple physical server computing devices are used, with some or all server computing devices implementing both the content curator portal server 216 and the server system 210. In some implementations, one physical server computing device is used, with the one physical server device implementing both the content curator portal server 216 and the server system 210.

The network 202 may be one or more public or private, wired or wireless networks, such as the Internet, or may be a Session Initiated Protocol (SIP) network such as the PsipTN™ network offered by TelTel™. The network 202 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. The network 202 may include multiple networks or subnetworks, each of which may include, for example, a wired or wireless data pathway.

Content may be downloaded to one or more user media player/downloader devices 218. For example, content corresponding to a user-subscribed channel may be automatically downloaded to the media player/downloader device 218, in response to a user selection of a corresponding channel. As another example, a user may search for and download content to the media player/downloader device 218. A user may, using a remote user device 220, monitor and manage user-initiated downloads. The remote user device 220 may be any type of electronic device configured to exchange communications with the server system 210 over a network. The remote user device 220 may be a general-purpose computer (e.g., a desktop personal computer, a workstation, or a laptop computer), a mobile or wireless device, or a device designed for a specific function (e.g., a cell phone, a smart phone, a tablet PC, a personal digital assistant (PDA), etc.).

Figure 3:
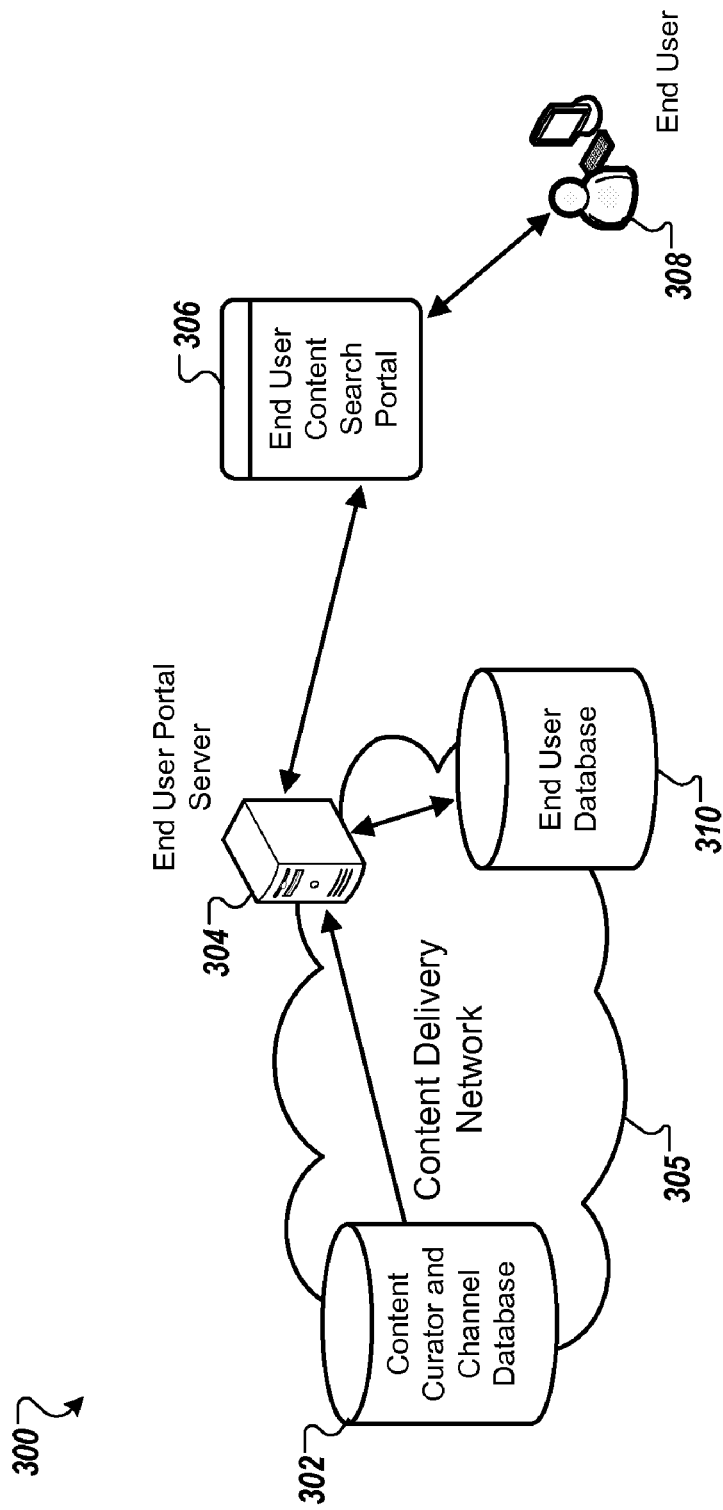

FIG. 3 illustrates an example system 300 for enabling a user to subscribe to channels. The system 300 includes a content curator and channel database 302 which includes channel definitions defined by content curators, along with content definitions for content included in defined channels, and supplemental channel information, such as preview content associated with content included in a channel. An end user portal server 304 may retrieve channel information from the content curator and channel database 302, over a content delivery network 305, and may display channel information in an end user content search portal 306.

The end user content search portal 306 may display a user interface which allows an end user 308 to browse available channels, to watch preview content associated with channel content, and to subscribe to channels. The end user 308 may subscribe to a subset of the available channels and may personalize one or more channels, such as by assigning a channel number or a genre to a subscribed channel. Channel subscriptions and channel personalizations may be stored by the end user portal server 304 in an end user database 310.

FIG. 4 illustrates a process 400 for providing channel information to users of a content delivery network. The operations of the process 400 are described generally as being performed by the system 200. The operations of the process 400 may be performed by one of the components of the system 200 (e.g., the server system 210) or may be performed by a combination of the components of the system 200. In some implementations, operations of the process 400 may be performed by one or more processors included in one or more electronic devices.

The system 200 enables a user to subscribe to available channels on a content delivery network (402). A user may subscribe to a channel defined by a content curator. For example, FIG. 5 illustrates a system 500 which includes channels 502, 504, 506, and 508 available over a content delivery network 510. Channel 502 includes content file "A" 512 and content file "B" 514, channel 504 includes content file "C" 516, channel 506 includes content file "D" 518 and content file "E" 520, and channel 508 includes content file "F" 522. A "user one" user has subscribed to channels 502 and 504, a "user two" user has subscribed to channels 504 and 508, and a "user three" user has subscribed to channel 506.

The system 200 may enable a user to subscribe to available channels by displaying, to the user, channel information and preview content for channels available on the content delivery network. The end user may browse channel information and view preview content using a user interface displayed on a user portal, with the user portal displayed, for example, on a display screen of a computing device or on a television screen in the user's home. As described in more detail below with respect to FIG. 6, the user may select one or more channels for subscription based on review of the channel information and preview content.

Figure 6:
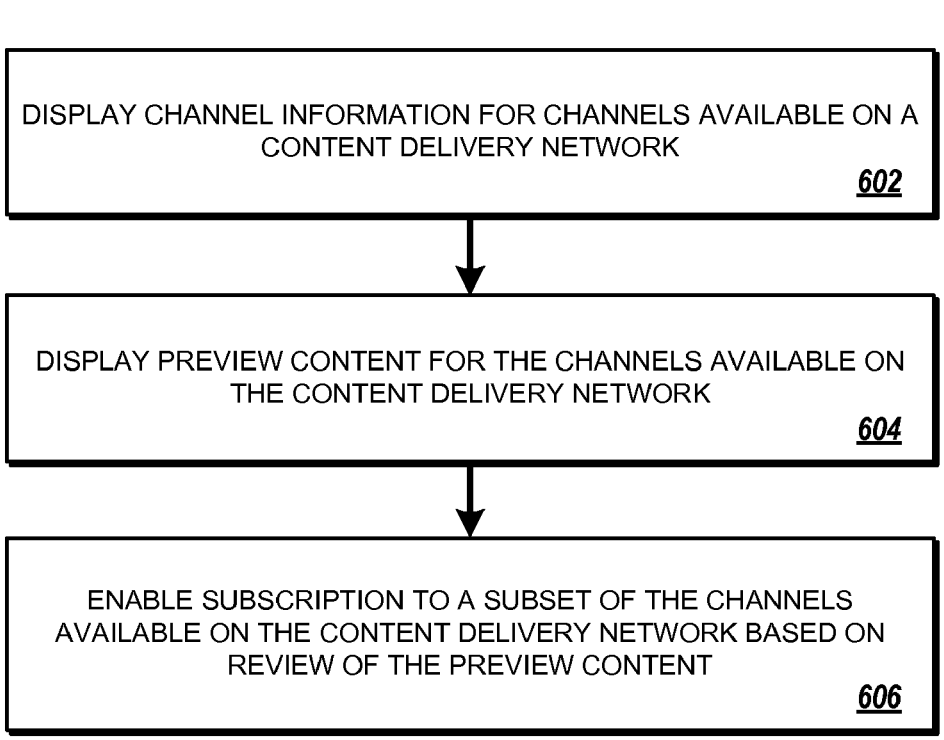

FIG. 6 illustrates a process 600 for enabling subscription to channels based on user review of channel information and preview content. The operations of the process 600 are described generally as being performed by the system 200. The operations of the process 600 may be performed by one of the components of the system 200 (e.g., the server system 210) or may be performed by a combination of the components of the system 200. In some implementations, operations of the process 600 may be performed by one or more processors included in one or more electronic devices.

The system 200 displays channel information for channels available on a content delivery network (602). For example, channel information may be displayed on a user interface, such as an example user interface 700 illustrated in FIG. 7. The user interface 700 may be displayed, for example, on a user portal (e.g., the end user content search portal 306, FIG. 3). The user may log in to the user portal to access the user interface 700. The user may use controls 702, 704, 706, and 708 to browse for channels. For example, the control 702 may be selected to view channel information for recommended channels (e.g., channels may be recommended based on a user's interests as stored in a user profile, or based on a similarity of recommended channels to a user's currently subscribed channels). A user may select control 706 to browse channel information by genre. Available genres may include sports, movies, entertainment, children's programming, drama, action, and music, to name a few examples. A user may select control 708 to browse channel information for popular channels. Channel popularity may be based, for example, on user ranking and/or subscriber count.

The user may select the control 704 to browse channel information by content curator. A user may select the control 704, and then select the name of a content curator to see channel information for channels defined by that content curator. For example, a channel information area 712 displays channel information for a "Rachel's Channel" channel defined by a "DJ Rachel" content curator. The channel information area 712 includes content representations 714, 716, 718, and 720, with respective associated content information 722, 724, 726, and 727.

A user may use other controls of the user interface 700 to browse for channels. For example, a user may select a control 728 to browse channel recommendations received from friend users. As another example, the user may search for channels by one or more keywords using a search control 729.

Returning to FIG. 6, the system 200 displays preview content for the channels available on the content delivery network (604). Preview content may be, for example, a subset of a content file (e.g., the first thirty seconds of a content file) or the preview content may be different content than the corresponding content file. Preview content may be for example, a movie trailer. A content curator may generate preview content for a content file or may associate a previously-generated preview content file (e.g., a movie trailer) with a content file. Preview content may be retrieved, for example, from a content curator and channel database.

Figure 7:
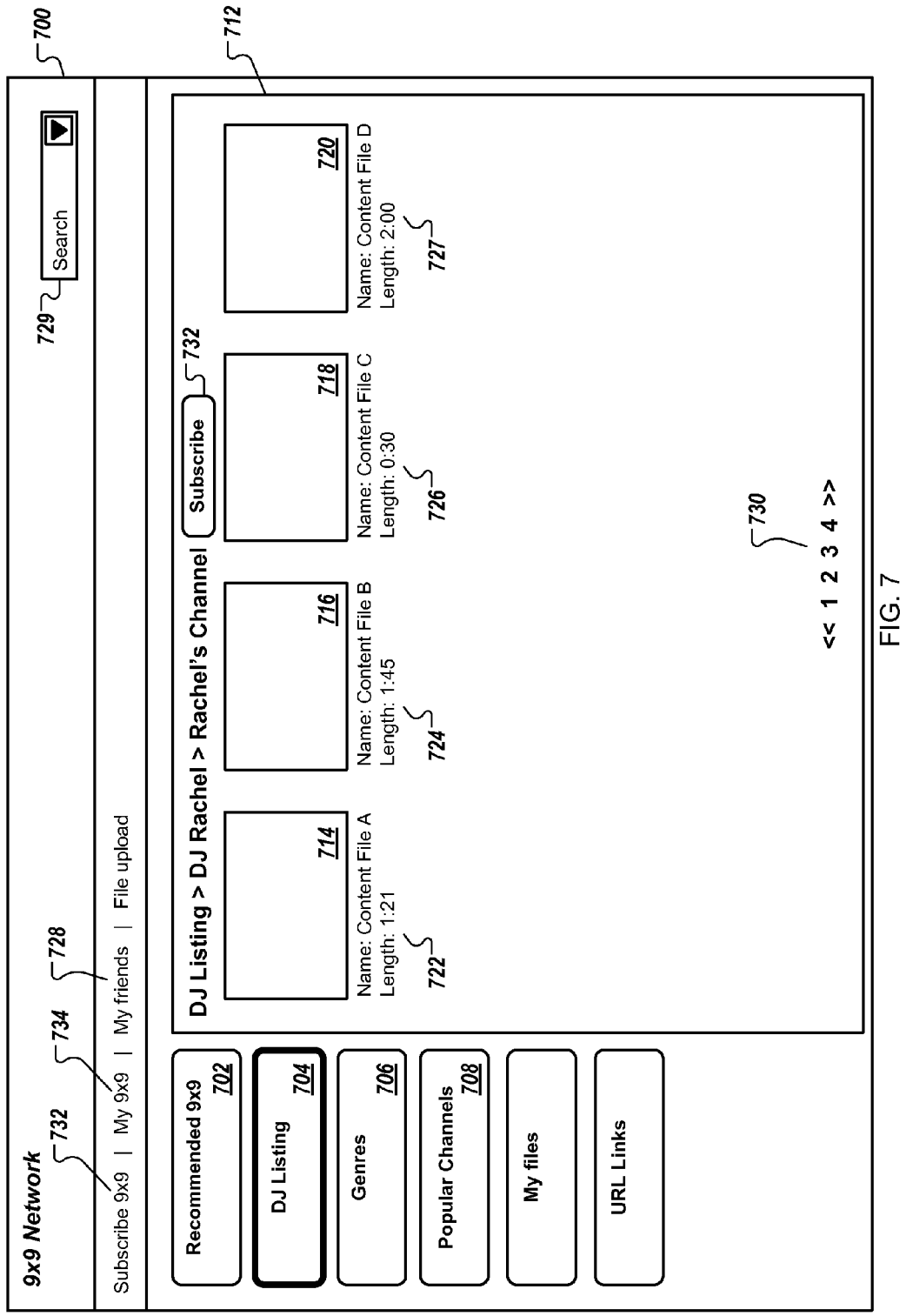
FIGS. 7, 9, and 11 are diagrams of exemplary user interfaces.

In the example of FIG. 7, a user of the user interface 700 may view preview content, for example, by selecting a content representation 714, 716, 718, and 720 (e.g., the user may view the preview content by "double-clicking" on a content representation 714, 716, 718, and 720). The user may navigate to see other content representations using a navigation control 730. In response to the selection of a content representation 714, 716, 718, and 720, a media player application may appear (e.g., in an area of the user interface 700 or in another user interface) and the preview content may be presented in the media player application.

Returning to FIG. 6, the system 200 enables subscription to a subset of the channels available on the content delivery network based on review of the preview content (606). For instance, in the example of FIG. 7, a user may subscribe to a channel after viewing preview content associated with channel content displayed in the channel area 712. For example, the user may subscribe to a channel using a subscribe control 732. The user may subscribe to one or more channels and may generally subscribe to a subset of available channels, based on user interest. The user may select a control 734 to see a current list of channel subscriptions.

Returning to FIG. 4, the system 200 receives, from the user, an input indicating a subscription to a subset of the available channels on the content delivery network (404). For instance, in the example of FIG. 7, the user may select the control 732 to subscribe to a channel. The user may browse to view channel information for other channels and may select the control 732 again to subscribe to a different channel.

The system 200 receives, from the user, user personalization of at least one of the subset of channels (406). For example, the user may assign a channel number or a genre to a channel, may add one or more content files to a channel, or may delete one or more content files from a channel. As another example, a user may associate metadata (e.g., a channel description, one or more content file descriptions) with a channel. Personalization of channels is described in more detail below with respect to FIGS. 8 and 10.

Figure 8:
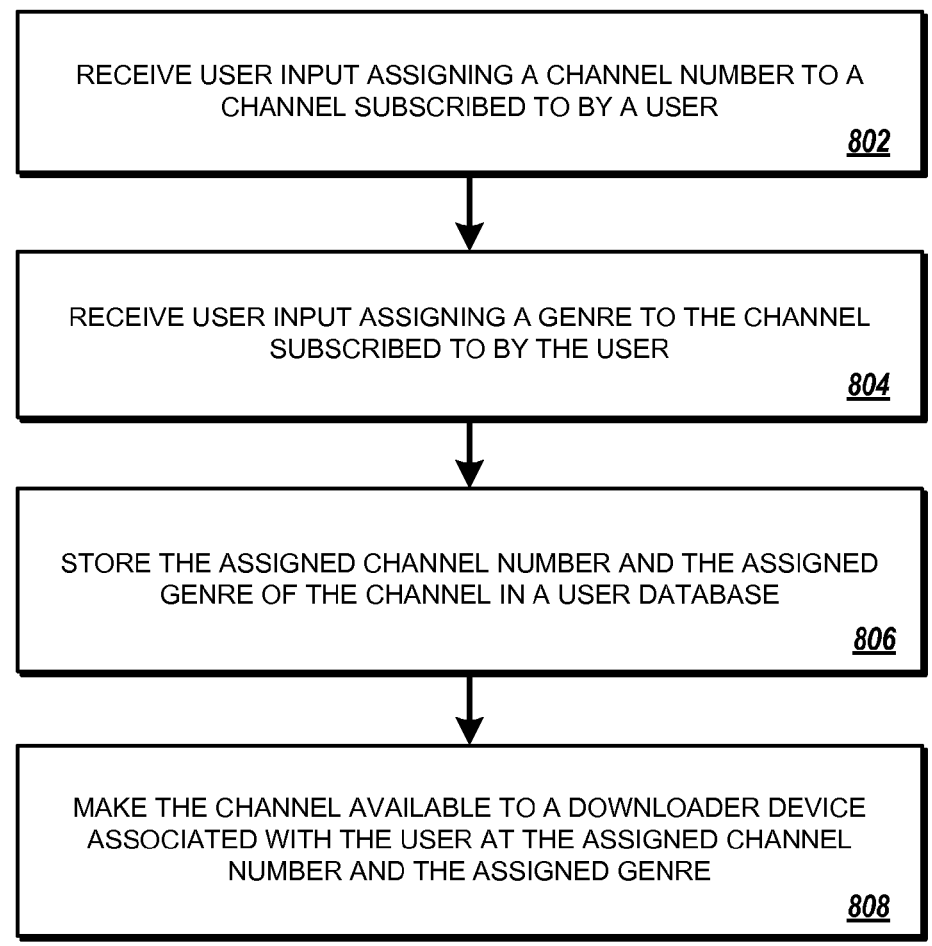

FIG. 8 illustrates a process 800 for personalizing a channel. The operations of the process 800 are described generally as being performed by the system 200. The operations of the process 800 may be performed by one of the components of the system 200 (e.g., the server system 210) or may be performed by a combination of the components of the system 200. In some implementations, operations of the process 800 may be performed by one or more processors included in one or more electronic devices.

Figure 9:
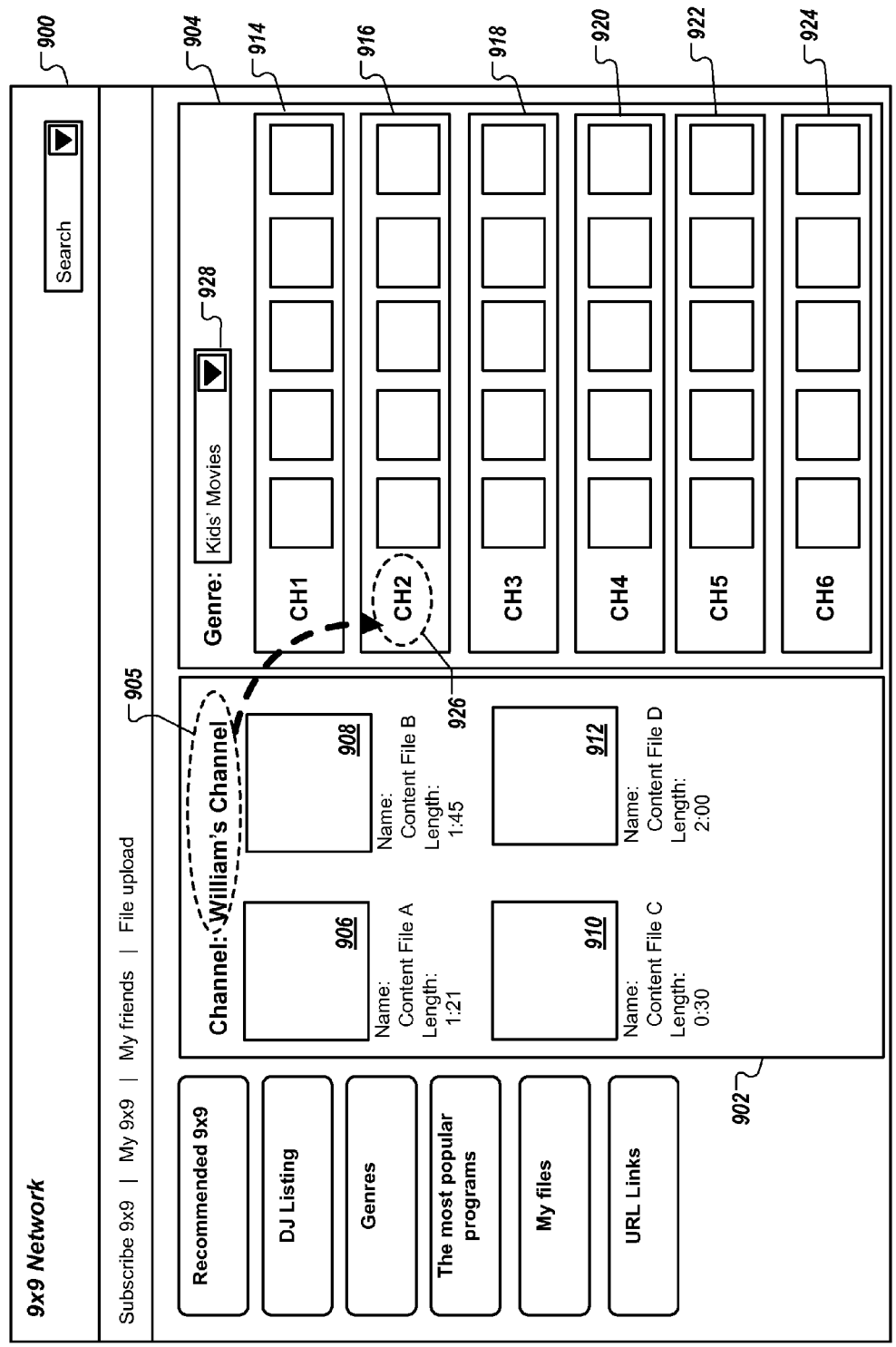

The system 200 receives user input assigning a channel number to a channel subscribed to by a user (802). For example, a user may assign a channel number to a channel using a user interface displayed on a user portal. FIG. 9 illustrates an example user interface 900 for configuring channels. The user interface 900 includes an available channel area 902 and a subscribed channels area 904. The available channel area 902 displays information about an available channel, such as a channel name (e.g., "William's Channel" 905) and content representations 906-912. "William's Channel" 905 may have been displayed in the available channel area 902, for example, in response to the user selecting "William's Channel" from a list of channels displayed on a different user interface displayed previously to the display of the user interface 900 or on an area of the user interface 900 that is now hidden. In some implementations, the available channel area 902 displays more than one channel.

The subscribed channels area 904 includes channel areas 914, 916, 918, 920, 922, and 924. A channel area 914, 916, 918, 920, 922, and 924 includes a channel number and a set of content representations. If a channel number is unassigned, the content representations in an associated channel area may be empty, and the channel area may also otherwise indicate that the associated channel is available (e.g., the channel area may be displayed in a different background color, or the font used for an unassigned channel number may be different than the font used for an assigned channel number). The user may assign a channel number to a channel, for example, by selecting a channel name (e.g., 905), "dragging" the channel name (e.g., by holding down a mouse or other pointing device), and "dropping" the channel name onto a channel number displayed in a channel area 914, 916, 918, 920, 922, and 924. For instance, as shown, a user assigns "William's Channel" 905 to channel number "two" 926 by dragging an icon representing "William's Channel" 905 onto the channel area 916. In some implementations, the user may "drop" the channel name anywhere in a channel area 914, 916, 918, 920, 922, and 924.

In some implementations, a default, initial channel line-up may be configured for a user. The default channel line-up may vary, for example, based on the geographic location of the user or based on other user demographics or user settings (e.g., a user's interests stated when a user first subscribes to the system). The subscribed channels area 904 may, upon first being displayed by the user, display information for the channels included in the default channel line-up. The user may customize the channels in the subscribed channel area 904, as described above. As another example, the user may remove a default or other channel from the subscribed channel area 904 to unsubscribe from a channel.

As another example, FIG. 5 illustrates in a channel lineup 523 that the "user one" user has assigned channel number one to the "DJ Channel Two" channel 504 and channel number two to the "DJ Channel One" channel 502. As shown in a channel lineup 524, the "user two" user has assigned channel number one to the "DJ Channel Two" channel 504 and channel number two to the "DJ Channel Four" channel 508. A channel lineup 525 for the "user three" user indicates that channel number one has been assigned to the "DJ Channel Three" channel 506.

Returning to FIG. 8, the system 200 receives user input assigning a genre to the channel subscribed to by the user (804). For instance, in the example of FIG. 9, the user may select a genre for a channel by selecting a channel area 914, 916, 918, 920, 922, and 924 corresponding to an assigned channel number, and then selecting a genre (e.g., "Kids' Movies") from a genre control 928.

The system 200 stores the assigned channel number and the assigned genre of the channel in a user database (806). For example, in reference to FIG. 3, the end user portal server 304 may store the assigned channel number and the assigned genre, in the end user database 310, in association with the channel. In the example of FIG. 5, the channel number personalizations for the "user one", "user two", and "user three" users may be stored in a user database 526.

The system 200 makes the channel available to a media player/downloader device associated with the user at the assigned channel number and the assigned genre (808). For example, in reference to FIG. 1, content associated with the channel may be downloaded to the media player device 130 or the downloader device 132 associated with the end user 104. Information indicating the assignment of the channel number and the genre of the channel may also be downloaded to the downloader device 132 and may be transferred, for example, to the media player device 130 (in some implementations, the media player 130 and the downloader device 132 are the same physical device).

Continuing the above example with reference to FIG. 1, the end user 104 may, for example, select a channel number using the remote control 138 and, in response, the media player 130 may be controlled to play the channel associated with the channel number and to present content associated with the channel on the television 106. As another example, an electronic guide may be presented on the television 106 which may include a listing of subscribed channels by genre. The user may navigate the electronic guide using the remote control 138, may select a genre, and may select a channel from a list of channels associated with the selected genre.

FIG. 10 illustrates a process 1000 for personalizing a channel by adding one or more content files to a channel. The operations of the process 1000 are described generally as being performed by the system 200. The operations of the process 1000 may be performed by one of the components of the system 200 (e.g., the server system 210) or may be performed by a combination of the components of the system 200. In some implementations, operations of the process 1000 may be performed by one or more processors included in one or more electronic devices.

Figure 11:
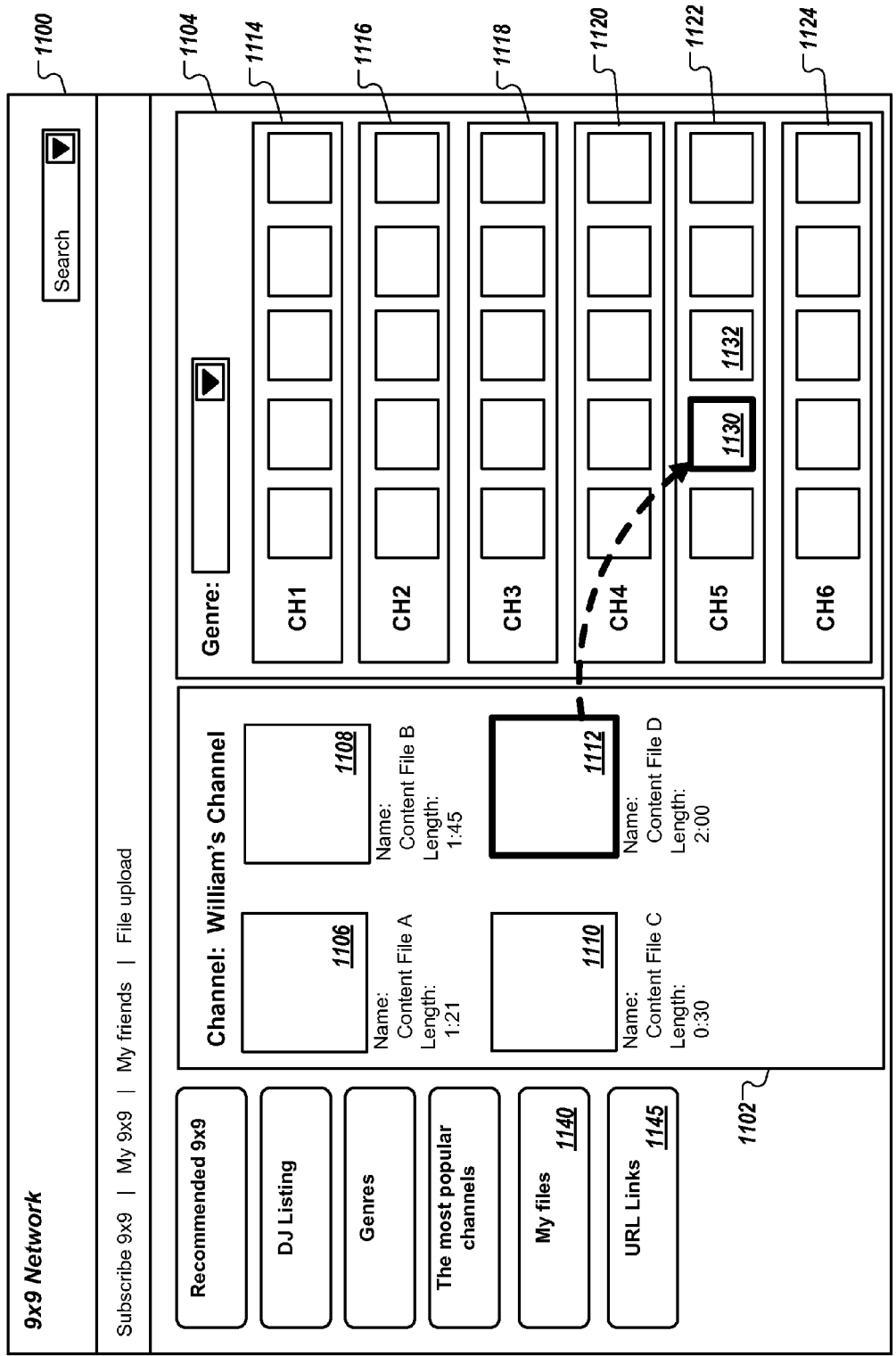

The system 200 receives, from a user, user input adding one or more content files to a channel (1002). The user may, for example, add one or more content files to a channel using a user interface displayed on an end user portal. For example, FIG. 11 illustrates an example user interface 1100. The user interface 1100 includes an available channel area 1102 and a subscribed channels area 1104. The available channel area 1102 displays information about an available channel, such as a channel name (e.g., "William's Channel") and content representations 1106, 1108, 1110, and 1112.

In some examples, the available channel area may be used to display content representations which represent content from a user's private collection. In these examples, the user may serve as his or her own content curator and define a personal channel using the content from the user's private collection. The personal channel may include content files stored on a user's local storage unit (e.g., local hard drive), such as home videos, music files from a personal collection, personal photographs, etc. The personal channel also may include content files stored on a user's network drive (e.g., personal files stored in a user's portion of a storage service in the cloud) or any generally available content files the user is able to access over a network. The user also may integrate content files from his or her private collection within channels defined by other content curators.

The subscribed channels area 1104 includes channel areas 1114, 1116, 1118, 1120, 1122, and 1124. A channel area 1114, 1116, 1118, 1120, 1122, and 1124 includes a channel number and a set of content representations. The user may add a content file to a channel, for example, by selecting a content representation 1106, 1108, 1110, and 1112 and "dragging and dropping" the channel representation 1106, 1108, 1110, and 1112 onto a content representation displayed in a channel area 1114, 1116, 1118, 1120, 1122, and 1124. For example, FIG. 11 illustrates the dropping of the content representation 1112 representing content file "D" onto a content representation 1130 included in the content area 1122 corresponding to "channel 5".

A user may use the interface 1100 to add one or more content files to a channel defined by a content curator or to add one or more content files to a newly-created channel to create a user-defined channel. If the content representation 1130 is empty (e.g., not associated with a content file) before the dropping of the content representation 1112, the content representation 1130 may be modified to represent the content file "D" after the dropping of the content representation 1112. If the content representation is currently representing a content file before the dropping of the content representation 1112, the dropping of the content representation 1112 may be interpreted as an "insert" action, and a new content representation may be added to the content area 1122 (e.g., without changing the content representation 1130). For example, a new content representation may be added between the content representation 1130 and a content representation 1132, with the newly added content representation representing content file "D".

The user may make other modifications to content files in a channel, such as deleting a content file from a channel or rearranging the content representations associated with the channel. The user may also add a content file which they had downloaded to their media player/downloader device to a channel. For example, the user may select a control 1140, and content representations corresponding to user-downloaded content files may be displayed in the area 1102. The user may select a content representation representing a downloaded content file and "drag and drop" the content representation onto a channel area 1114, 1116, 1118, 1120, 1122, and 1124 corresponding to a subscribed channel. As another example, the user may select a control 1145, and content representations corresponding to content available through a content link may be displayed in the area 1102. The user may select a content representation representing content available through a content link and "drag and drop" the content representation onto a channel area 1114, 1116, 1118, 1120, 1122, and 1124 corresponding to a subscribed channel, and, in response, the content available through the content link may be downloaded to a media player/downloader device associated with the user.

Returning to FIG. 10, the system 200 sets a personalized definition of the channel based on the received user input (1004). For example, a personalized definition may represent and indicate a user's content additions to and/or content rearrangement of a channel.

The system 200 stores the personalized definition of the channel in a user database (1006). For example, in reference to FIG. 3, the end user portal server 304 may store the personalized definition, in the end user database 310, in association with the channel and with the user.

The system 200 makes the personalized definition of the channel available to a media player/downloader device associated with the user (1008). For example, the personalized definition may be downloaded to a media player/downloader device of the user and may be transferred, for example, to an associated media player device. If the user selects a channel (e.g., using a remote control device), the media player may access the personalized definition of the channel to determine which content to play (e.g., to determine whether a content file added to a channel by a user should be played, or to determine whether a content file added by a content curator during channel definition should be played).

Returning to FIG. 4, the system 200 identifies a user identity of the user (408). For example, the user may be identified based on login information the user provided when logging in to an end user portal.

The system 200 stores, in a user database, channel subscription information for the user identity based on the subset of channels to which the user subscribed and the user personalization (410). For example, in reference to FIG. 3, the end user portal server 304 may store channel subscription information and user personalization, in the end user database 310, in association with the channel.

The system 200 identifies a media player/downloader device associated with the user identity (412). For example, in reference to FIG. 3, a media player/downloader device associated with the user identity may be identified by querying the end user database 310 with the user identity.

The system 200 controls the media player/downloader device based on the channel subscription information (414). For example, in reference to FIG. 1, the media player device 130 or the downloader device 132 may download content for each channel subscribed to by the end user 104. The end user 104 may select a channel number corresponding to a subscribed channel using the remote control 138 and the media player 130 may be controlled to play the channel associated with the channel number and to present content associated with the channel on the television 106.

In the example of FIG. 5, content associated with the "user one", "user two", and "user three" users may be downloaded to media player/downloader storage areas 530, 532, 534, respectively. For example, the media player/downloader storage area 530 associated with the "user one" user includes content files 540 and 542 corresponding to content files "A" 512 and "B" 514 included in the subscribed channel 502 and includes content file 544 corresponding to content file "C" 516 included in the subscribed channel 504. The media player/downloader storage area 532 associated with the "user two" user includes content file 546 corresponding to content file "C" 516 included in the subscribed channel 504 and includes content file 548 corresponding to content file "F" 522 included in the subscribed channel 508. As another example, the media player/downloader storage area 534 associated with the "user three" user includes content files 550 and 552 corresponding to content files "D" 518 and "E" 520 included in the subscribed channel 506.

Figure 12:
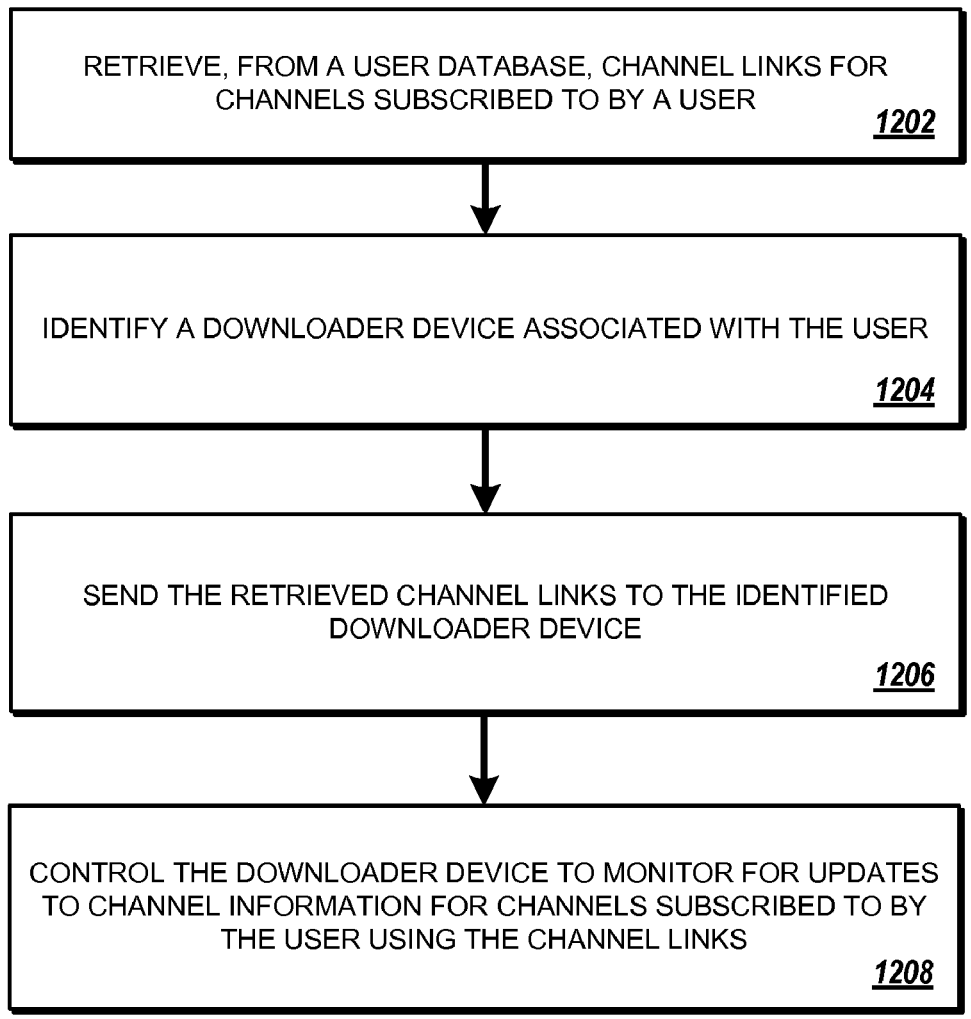

Controlling a media player/downloader device based on channel subscription information is described in more detail below with respect to FIGS. 12-15. FIG. 12 illustrates a process 1200 for controlling a media player/downloader device. The operations of the process 1200 are described generally as being performed by the system 200. The operations of the process 1200 may be performed by one of the components of the system 200 (e.g., the server system 210) or may be performed by a combination of the components of the system 200. In some implementations, operations of the process 1200 may be performed by one or more processors included in one or more electronic devices.

Figure 13:
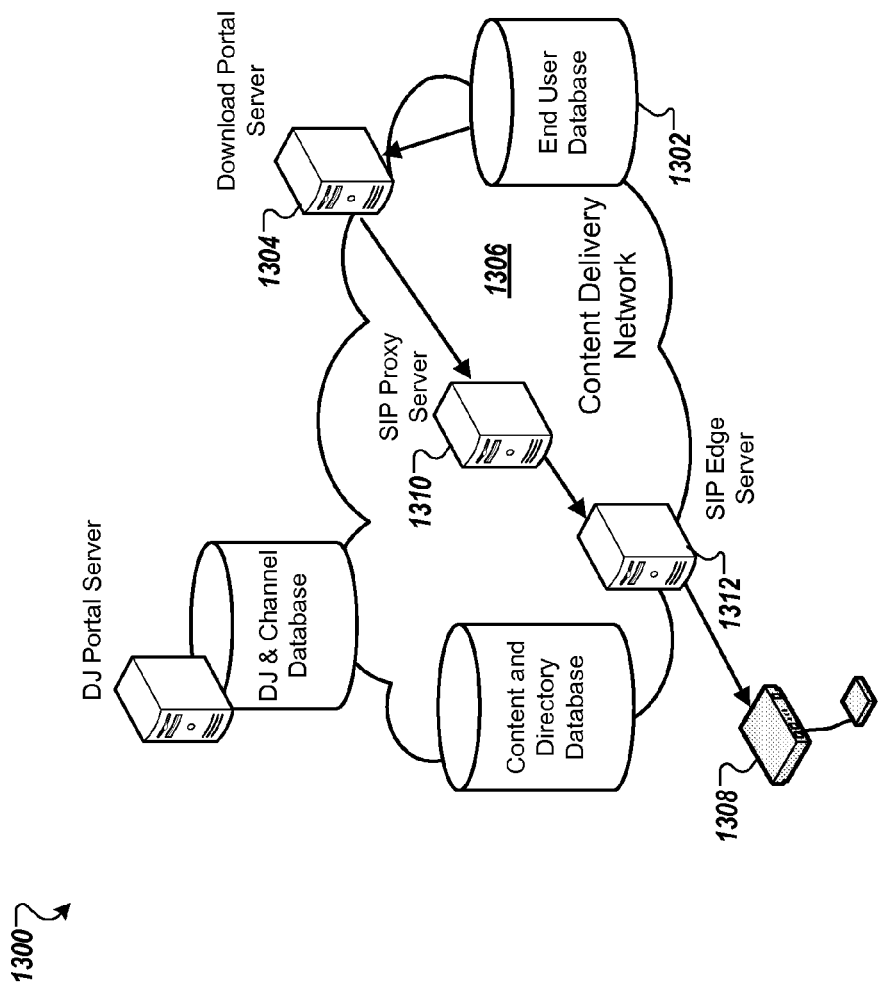

The system 200 retrieves, from a user database, channel links for channels subscribed to by a user (1202). For example, FIG. 13 illustrates a system 1300 which includes an end user database 1302. A download portal server 1304 may retrieve one or more channel links for channels subscribed to by a user from the end user database 1302, over a content delivery network 1306. A channel link may be an address of a file which includes information on new or updated content available to subscribers of a channel. A channel link may be, for example, a link to an RSS (Really Simple Syndication) file.

The system 200 identifies a media player/downloader device associated with the user (1204). For instance, in the example of FIG. 13, a media player/downloader device 1308 may be identified. The media player/downloader device 1308 may be identified, for example, by the download portal server 1304 querying the end user database 1302, using user identifying information, to find an address or other identifying information of a media player/downloader device mapped to the user identifying information.

The system 200 sends the retrieved channel links to the identified media player/downloader device (1206). For instance, in the example of FIG. 13, the download portal server 1304 may establish a session with the media player/downloader device 1308. The session may be, for example, a SIP (Session Initiated Protocol) session. A SIP proxy server 1310 may be used to route the request to download the channel links to a server which is closer to the media player/downloader device 1308 than the download portal server 1304, such as a SIP edge server 1312.

The system 200 controls the media player/downloader device to monitor for updates to channel information for channels subscribed to by the user using the channel links (1208). For instance, in the example of FIG. 13, the media player/downloader device 1308 may periodically download an RSS file linked to by a channel link and may compare the downloaded RSS file to a previously downloaded RSS file associated with the channel link to determine whether the downloaded RSS file is different than the previously downloaded RSS file. Differences between the downloaded RSS file and the previously downloaded RSS file may indicate updates to channel information, such as new or modified content links, hot indices, metadata, or content preview files. When updates to the channel information are detected, the media player/downloader device 308 downloads the updated channel information.

Figure 14:
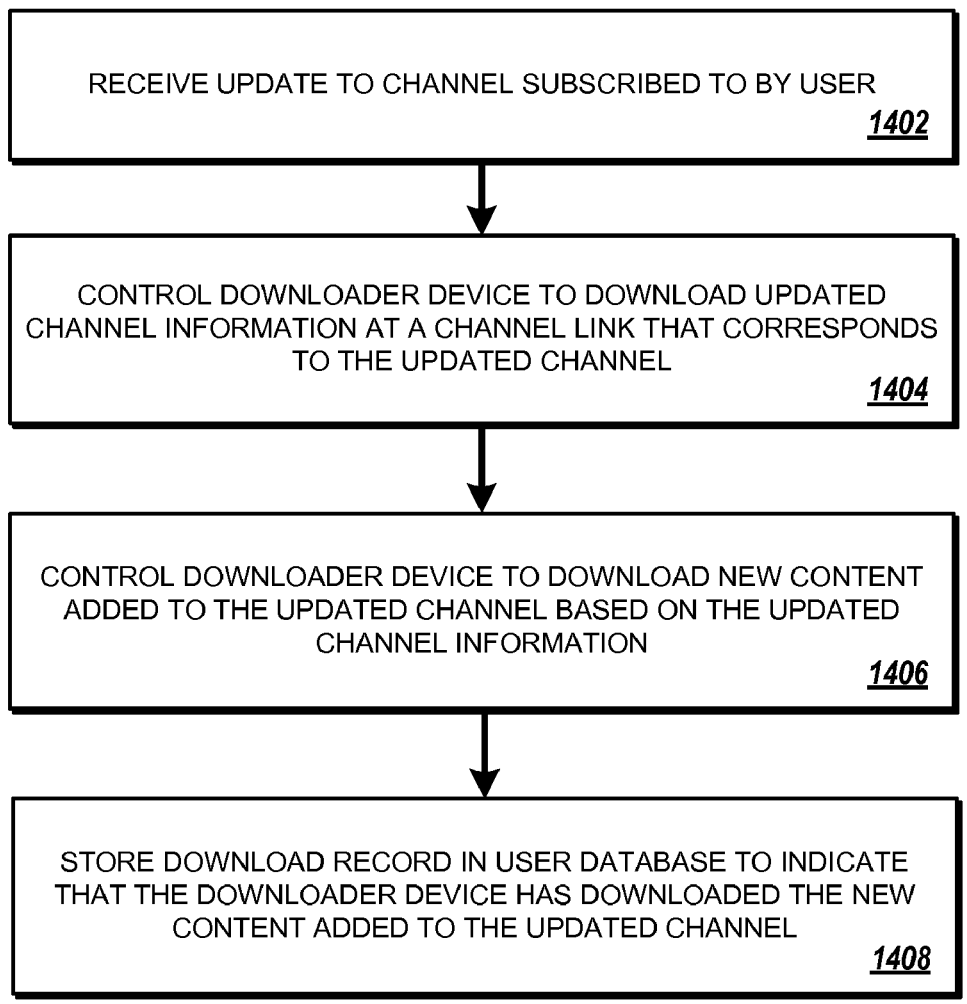

FIG. 14 illustrates a process 1400 for downloading new content to a media player/downloader device. The operations of the process 1400 are described generally as being performed by the system 200. The operations of the process 1400 may be performed by one of the components of the system 200 (e.g., the server system 210) or may be performed by a combination of the components of the system 200. In some implementations, operations of the process 1400 may be performed by one or more processors included in one or more electronic devices.

Figure 15:
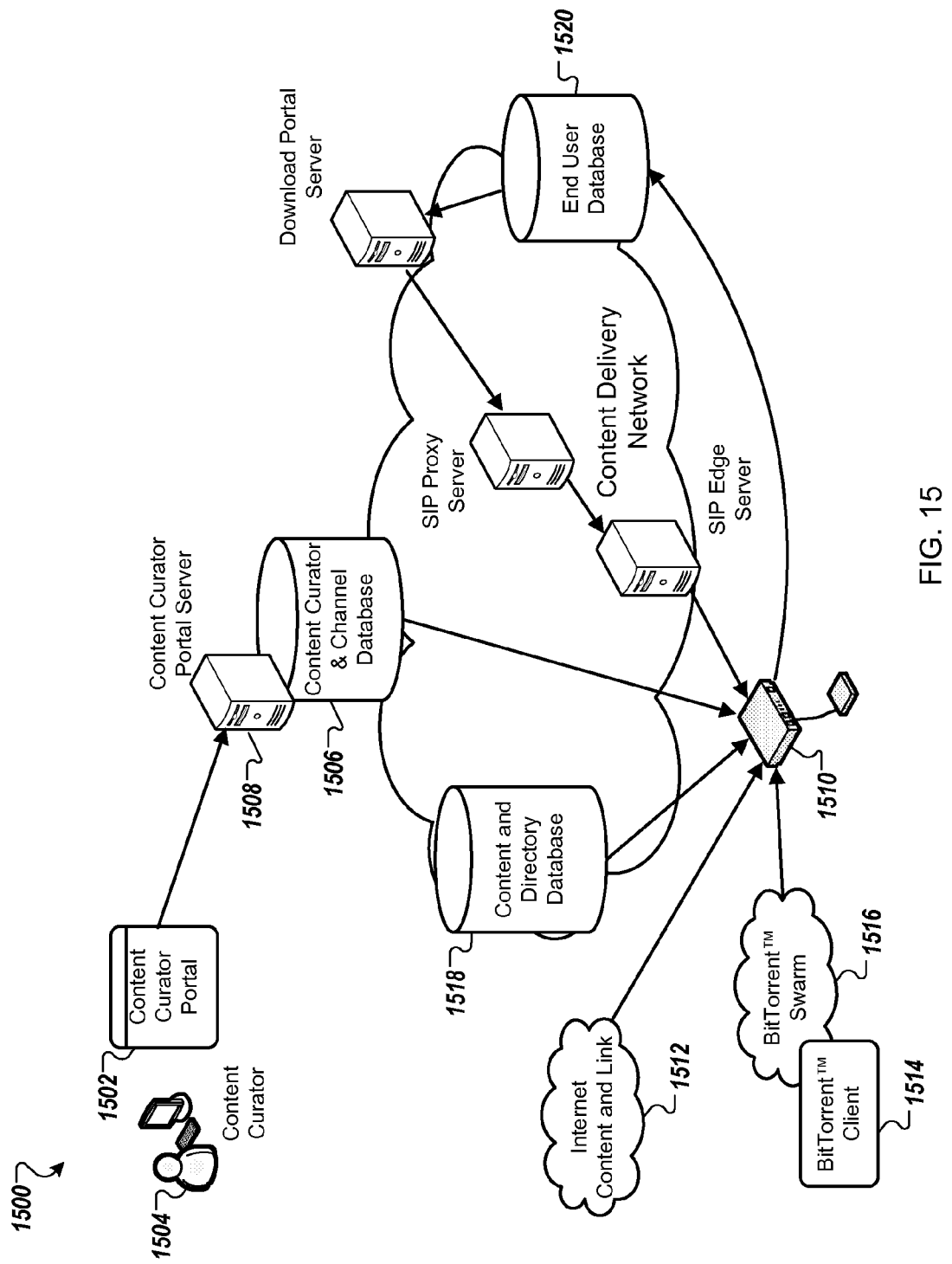

The system 200 receives updates to a channel subscribed to by a user (1402). For example, an RSS file linked to by a channel link may be updated in response to updates made to a channel by a content curator. For example, FIG. 15 illustrates a system 1500 which includes a content curator portal 1502. A content curator 1504 may use the content curator portal 1502 to update a channel (e.g., add, edit, or delete a content file, metadata, hot index, or content preview file). The updates to the channel may be stored in a content curator and channel database 1506 by a content curator portal server 1508. For example, updates to the channel may be described in an RSS file stored in the content curator and channel database 1506 and the RSS file may be made available through a channel link associated with the channel.

The system 200 controls a media player/downloader device to download updated channel information at a channel link that corresponds to the updated channel (1404). In some implementations, an updated RSS file associated with the channel link is sent to a media player/downloader device, in response to receiving updates to the updated channel. For instance, in the example of FIG. 15, the content curator portal server 1508 may send an updated RSS file to a media player/downloader device 1510. The media player/downloader device 1510 also may access an updated RSS file directly from the content curator and channel database 1506.

In some implementations, the media player/downloader device 1510 may periodically download an RSS file linked to by a channel link and may compare the downloaded RSS file to a previously downloaded RSS file associated with the channel link to determine whether the downloaded RSS file is different than the previously downloaded RSS file. Differences between the downloaded RSS file and the previously downloaded RSS file may indicate updates to channel information, such as new or modified content links, hot indices, metadata, or content preview files. In some implementations, the updates to channel information may be sent from the content curator portal server 1508 to the media player/downloader device 1510 in response to the storing of the updates to channel information in the content curator and channel database 1506. In these implementations, the content curator portal server 1508 sends the updates to channel information to the media player/downloader device 1510 using an API or another communication mechanism.

Returning to FIG. 14, the system 200 controls the media player/downloader device to download new content added to the updated channel based on the updated channel information (1406). For instance, in the example of FIG. 15, the media player/downloader device 1510 may retrieve one or more content links associated with new content files added to the updated channel from an RSS file linked to by a channel link. Each content link may be, for example, a link to Internet content 1512 (e.g., a link to Internet streaming content), or a link to a torrent file. If the content link is a link to a torrent file, the torrent file may be downloaded and the torrent file may be used to download a content file from one or more BitTorrent™ clients 1514 included in one or more BitTorrent™ swarms 1516.

If the content link is a link to streaming content, the media player/downloader device 1510 may determine whether the streaming content already exists in a content and directory database 1518. If the streaming content exists in the content and directory database 1518, the media player/downloader device 1510 may download a torrent file associated with the streaming content from the content and directory database 1518 and may use the downloaded torrent file to download the streaming content. If the streaming content does not exist in the content and directory database 1518, the media player/downloader device 1510 may download the streaming content from a streaming website associated with the content link.

Returning to FIG. 14, the system 200 stores a download record in a user database to indicate that the media player/downloader device has downloaded the new content added to the updated channel (1408). For instance, in the example of FIG. 15, a download record associated with the media player/downloader device 1510 may be stored in an end user database 1520. A download record may include, for example, data values indicating a status (e.g., "complete", "in progress", "aborted"), a content file name, a channel name, a file size, start and end times, lapsed time, and retry count.

The media player/downloader device 1510 also is capable of streaming content in addition to downloading content. Accordingly, streaming content may be included in a channel with downloaded content and the media player/downloader device 1510 may seamlessly switch between outputting downloaded content and outputting streaming content. The media player/downloader device 1510 further may store records that indicate when streaming content is accessed and outputted by the media player/downloader device 1510.

In addition to using the user interfaces described above with respect to FIGS. 7, 9, and 11 to personalize channel information, a user may also personalize their system using a remote control device. For example, a user may personalize channel information using one or more user interfaces displayed on a display screen of the remote control device. As another example, the user may use a remote control device to control an interface displayed on a display screen (e.g., television) being output by a media player/downloader device. A user may use an interface displayed on the display screen of the remote control device, or an interface displayed on a television to, for example, delete a content file from a channel, or to assign a channel number to a channel.

The user interfaces displayed on the display screen of the remote control device or on a television screen may offer a subset of functionality and may use different user interface controls and techniques as compared to more complex user interfaces such as the user interfaces 700, 900, and 1100. The user interfaces 700, 900, and 1100 may be displayed, for example, on a desktop computer, a laptop computer, or another type of computing device, such as part of a web application or another type of graphical user interface application.

Figure 16:
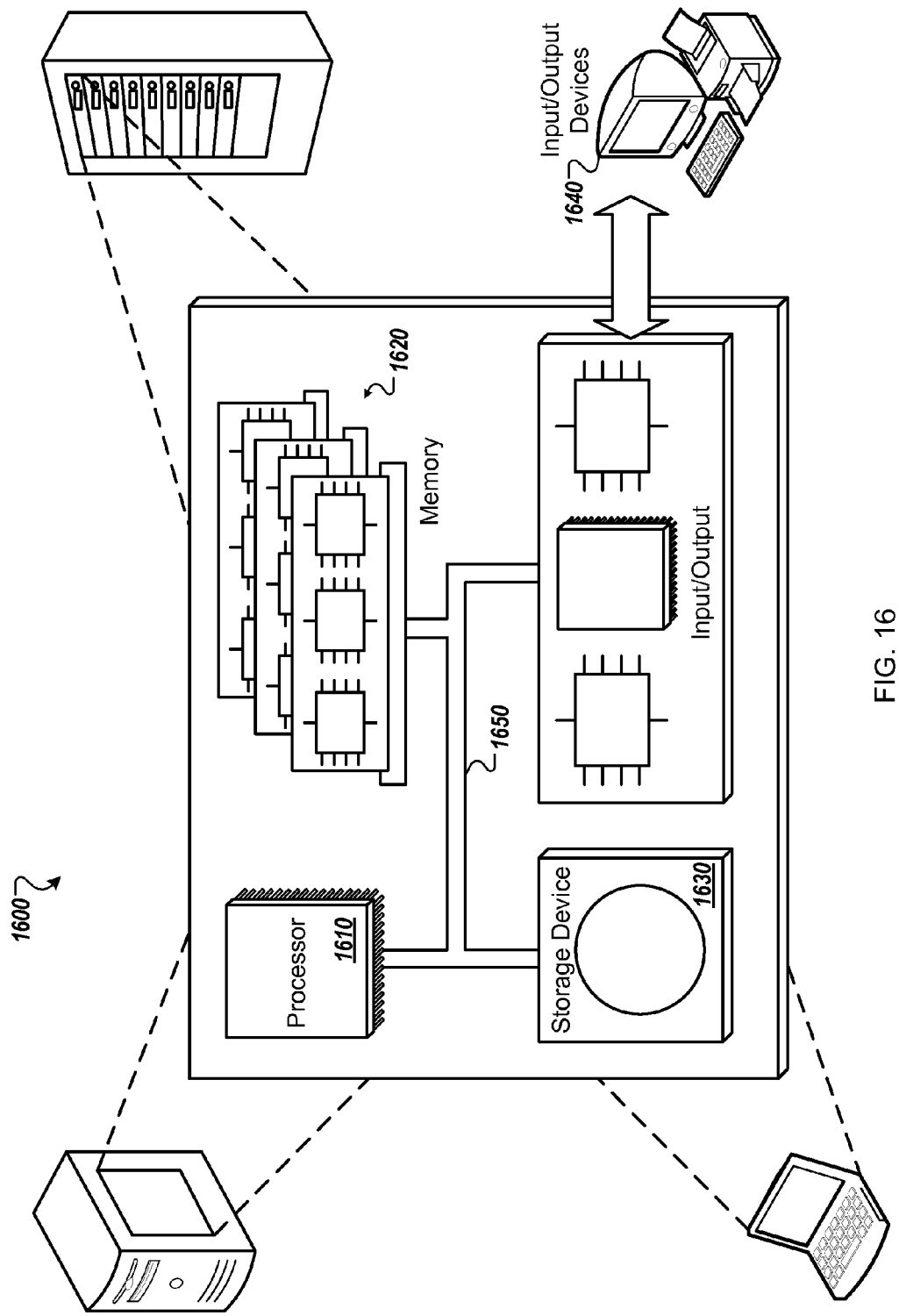

FIG. 16 is a schematic diagram of an example of a generic computer system 1600. The system 1600 can be used for the operations described in association with the processes 400, 600, 800, 1000, 1200, and 1400, according to one implementation. For example, the system 1600 may be included in either or all of the server system 210 and the server 216.

The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In another implementation, the memory 1620 is a non-volatile memory unit.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device.

The input/output device 1640 provides input/output operations for the system 1600. In one implementation, the input/output device 1640 includes a keyboard and/or pointing device. In another implementation, the input/output device 1640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method of providing channel information to users of a content delivery network, the method comprising:
    enabling a user to subscribe to available channels on a content delivery network;
    receiving, from the user, subscription to a subset of the available channels on the content delivery network;
    receiving, from the user, user personalization of at least one channel;
    identifying a user identity of the user;
    storing, in a user database, channel subscription information for the user identity based on the subset of channels to which the user subscribed and the user personalization;
    identifying a media device associated with the user identity; and
    controlling the media device based on the channel subscription information stored in the user database,
    wherein receiving, from the user, user personalization of at least one channel comprises:
        displaying representations of content files from a private collection of the user;
        after displaying representations of content files included in the private collection of the user, receiving, from the user, input selecting one or more of the content files from the private collection of the user to include in a channel to which the user subscribed; and
        based on the input selecting the one or more content files, including the one or more content files from the private collection of the user in the channel to which the user subscribed such that the channel includes content files added to the channel by a content curator that is different than the user and the one or more content files from the private collection of the user.

2. The method of claim 1:
    wherein enabling a user to subscribe to available channels on a content delivery network comprises displaying, to the user, channel information for channels available on the content delivery network,
    wherein receiving, from the user, subscription to a subset of the available channels on the content delivery network comprises receiving, from the user, user input subscribing to a subset of channels included in the displayed channel information.

3. The method of claim 2 wherein enabling a user to subscribe to available channels on a content delivery network further comprises:
    displaying, to the user, preview content for the channels available on the content delivery network; and
    enabling subscription to a subset of channels included in the displayed channel information based on review of the preview content.

4. The method of claim 1:
    wherein receiving, from the user, user personalization of at least one channel comprises receiving user input assigning a channel number to a channel subscribed to by the user;
    wherein storing, in a user database, channel subscription information for the user identity comprises storing the assigned channel number of the channel in the user database; and
    wherein controlling the media device based on the channel subscription information stored in the user database comprises making the channel available on the media device at the assigned channel number.

5. The method of claim 1:
    wherein receiving, from the user, user personalization of at least one channel comprises receiving user input assigning a genre to a channel subscribed to by the user;
    wherein storing, in a user database, channel subscription information for the user identity comprises storing the assigned genre of the channel in the user database; and
    wherein controlling the media device based on the channel subscription information stored in the user database comprises making the channel available on the media device at the assigned genre.

6. The method of claim 1:
    wherein receiving, from the user, user personalization of at least one channel comprises receiving, from the user, user input adding one or more content files to a channel;
    wherein storing, in a user database, channel subscription information for the user identity comprises setting a personalized definition of the channel based on the received user input and storing the personalized definition of the channel in the user database; and
    wherein controlling the media device based on the channel subscription information stored in the user database comprises making the personalized definition of the channel available to the media device.

7. The method of claim 6:
    wherein receiving, from the user, user input adding one or more content files to a channel comprises receiving, from the user, user input adding one or more content files to a user-defined channel that only includes content files added by the user;
    wherein setting a personalized definition of the channel based on the received user input comprises defining the user-defined channel to include the one or more content files; and
    wherein making the personalized definition of the channel available to the media device comprises making the user-defined channel available to the media device.

8. The method of claim 6:
    wherein receiving, from the user, user input adding one or more content files to a channel comprises receiving, from the user, user input adding one or more content files to a channel defined by a content curator that includes content files added by the content curator;
    wherein setting a personalized definition of the channel based on the received user input comprises supplementing the channel to include the one or more content files added by the user in addition to the content files added by the content curator; and
    wherein making the personalized definition of the channel available to the media device comprises making the supplemented channel available to the media device.

9. The method of claim 1 wherein controlling the media device based on the channel subscription information stored in the user database comprises:
    retrieving, from the user database, channel links for the subset of channels subscribed to by the user;
    sending the retrieved channels links to the media device; and controlling the media device to monitor for updates to channel information for channels subscribed to by the user using the channel links.

10. The method of claim 9:
wherein identifying a media device associated with the user identity comprises mapping the user identity to an address of the media device at which the media device is available on a network; and
wherein sending the retrieved channels links to the media device comprises sending the retrieved channels links to the address.

11. The method of claim 1 wherein controlling the media device based on the channel subscription information stored in the user database comprises:
retrieving, from the user database, personalization information for the at least one channel;
sending the retrieved personalization information to the media device; and
controlling the media device to modify the at least one channel in accordance with the retrieved personalization information.

12. The method of claim 1 wherein controlling the media device based on the channel subscription information stored in the user database comprises:
receiving an update to a channel subscribed to by the user;
controlling the media device to download updated channel information published at a channel link that corresponds to the updated channel; and
controlling the media device to download new content added to the updated channel based on the updated channel information.

13. The method of claim 12 further comprising:
receiving an indication that the media device downloaded the new content added to the updated channel; and
storing a download record in the user database to indicate that the media device has downloaded the new content added to the updated channel.

14. The method of claim 1 wherein controlling the media device based on the channel subscription information stored in the user database comprises:
receiving an update to supplemental channel information for a channel subscribed to by the user;
controlling the media device to download the updated supplemental channel information published at a channel link that corresponds to the channel; and
controlling the media device to control previously-stored content for the channel based on the updated supplemental channel information.

15. The method of claim 1:
wherein receiving, from the user, subscription to a subset of the available channels on the content delivery network comprises receiving, from a first user, subscription to a first subset of the available channels on the content delivery network and receiving, from a second user, subscription to a second subset of the available channels on the content delivery network, the first user being different than the second user and the first subset of the channels being different than the second subset of the channels;
wherein identifying a user identity of the user comprises identifying a first user identity of the first user and identifying a second user identity of the second user;
wherein storing, in a user database, channel subscription information for the user identity comprises storing, in the user database, first channel subscription information for the first user identity based on the first subset of channels to which the first user subscribed and storing, in the user database, second channel subscription information for the second user identity based on the second subset of channels to which the second user subscribed;
wherein identifying a media device associated with the user identity comprises identifying a first media device associated with the first user identity and identifying a second media device associated with the second user identity; and
wherein controlling the media device based on the channel subscription information stored in the user database comprises controlling the first media device based on the first channel subscription information stored in the user database and controlling the second media device based on the second channel subscription information stored in the user database.

16. The method of claim 1:
wherein receiving, from the user, user personalization of at least one channel comprises receiving, from a first user, first personalization of a first channel subscribed to by the first user and receiving, from a second user, second personalization of the first channel subscribed to by the second user, the first user being different than the second user and the first personalization being different than the second personalization;
wherein identifying a user identity of the user comprises identifying a first user identity of the first user and identifying a second user identity of the second user;
wherein storing, in a user database, channel subscription information for the user identity comprises storing, in the user database, first channel subscription information for the first user identity based on the first personalization to the first channel and storing, in the user database, second channel subscription information for the second user identity based on the second personalization to the first channel;
wherein identifying a media device associated with the user identity comprises identifying a first media device associated with the first user identity and identifying a second media device associated with the second user identity; and
wherein controlling the media device based on the channel subscription information stored in the user database comprises controlling the first media device to personalize the first channel for the first user based on the first channel subscription information stored in the user database and controlling the second media device to personalize the first channel for the second user based on the second channel subscription information stored in the user database.

17. The method of claim 1 wherein enabling a user to subscribe to available channels on a content delivery network comprises enabling a user to subscribe to available channels that are each defined by a different content curator.

18. The method of claim 1 wherein controlling the media device based on the channel subscription information stored in the user database comprises:
retrieving, from the user database, the channel subscription information; and
sending the retrieved channel subscription information to the media device.

19. The method of claim 1 wherein receiving, from the user, user personalization of at least one channel comprises receiving, from the user, input defining a personal channel for the user that includes content files selected by the user to include in the personal channel.

20. A system comprising:
at least one computer; and at least one computer-readable medium coupled to the at least one computer having instructions stored thereon which, when executed by the at least one computer, causes the at least one computer to perform operations comprising:
  enabling a user to subscribe to available channels on a content delivery network;
  receiving, from the user, subscription to a subset of the available channels on the content delivery network;
  receiving, from the user, user personalization of at least one channel;
  identifying a user identity of the user;
  storing, in a user database, channel subscription information for the user identity based on the subset of channels to which the user subscribed and the user personalization;
  identifying a media device associated with the user identity; and
  controlling the media device based on the channel subscription information stored in the user database,
  wherein receiving, from the user, user personalization of at least one channel comprises:
    displaying representations of content files from a private collection of the user;
    after displaying representations of content files included in the private collection of the user, receiving, from the user, input selecting one or more of the content files from the private collection of the user to include in a channel to which the user subscribed; and
    based on the input selecting the one or more content files, including the one or more content files from the private collection of the user in the channel to which the user subscribed such that the channel includes content files added to the channel by a content curator that is different than the user and the one or more content files from the private collection of the user.

21. At least one computer-readable storage medium encoded with at least one computer program comprising instructions that, when executed, operate to cause a computer to perform operations comprising:
  enabling a user to subscribe to available channels on a content delivery network;
  receiving, from the user, subscription to a subset of the available channels on the content delivery network;
  receiving, from the user, user personalization of at least one channel;
  identifying a user identity of the user;
  storing, in a user database, channel subscription information for the user identity based on the subset of channels to which the user subscribed and the user personalization;
  identifying a media device associated with the user identity; and
  controlling the media device based on the channel subscription information stored in the user database,
  wherein receiving, from the user, user personalization of at least one channel comprises:
    displaying representations of content files from a private collection of the user;
    after displaying representations of content files included in the private collection of the user, receiving, from the user, input selecting one or more of the content files from the private collection of the user to include in a channel to which the user subscribed; and
    based on the input selecting the one or more content files, including the one or more content files from the private collection of the user in the channel to which the user subscribed such that the channel includes content files added to the channel by a content curator that is different than the user and the one or more content files from the private collection of the user.

* * * * *